Figure 1:
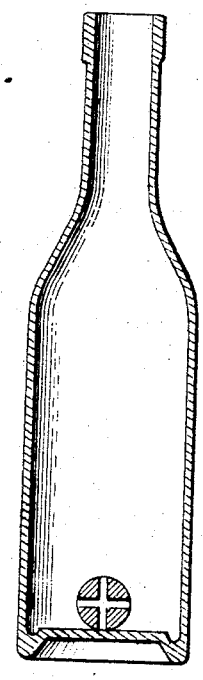

C. SCHMIDT.
RADIO-ACTIVE MATERIAL.
APPLICATION FILED JAN. 10, 1911.

1,032,779.

Patented July 16, 1912.

Witnesses
B. Dommers
M. H. Darg

Inventor
Curt Schmidt
By Henry Orth Jr.
Attorney

UNITED STATES PATENT OFFICE.

CURT SCHMIDT, OF NEAR FREIENWALDE-ON-THE-ODER, GERMANY

RADIO-ACTIVE MATERIAL.

1,032,779.

Specification of Letters Patent. Patented July 16, 1912.

Application filed January 10 1911. Serial No. 601,927.

*To all whom it may concern:*

Be it known that I, CURT SCHMIDT, a citizen of the German Empire, works director, of Alum Works, near Freienwalde-on-the-Oder, Germany, have invented certain new and useful Improvements Relating to Radio-Active Materials; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a radio-active material, which is designed to render other solid bodies, gases or liquids radio-active by emanation.

Radio-active materials already exist, in which the radio-active substance proper is mixed with inert bodies and forms together with said bodies a porous whole. The essential feature of the invention consists in using a material of a clay or loam like character, i. e., an argillaceous material which, when subjected to a burning process, acts as a binding agent, forming with the radio-active substances solid radio-active bodies which possess a highly porous structure that are insoluble in water and other liquids. If desired other substances can be mixed therewith, previous to the burning process, in order to increase the porosity. Such a material has the advantage that the radio-active substance proper cannot be dissolved out of the porous mass by a liquid and that the liquid is not colored. Many radio-active substances consist of ores or powdered residues obtained in the treatment of uranium compounds, which under ordinary circumstances are easily dissolved by liquids and color them. This must however be avoided, when, for example, it is desired to render a liquid active by using such a substance, supposing that said liquid has to be used for the exterior treatment of the human body or as a medicinal drink. The new substance renders the use of such liquids for one of the most important purposes possible, that is, for the transport of mineral waters in bottles, convenient because the appearance and composition of these clear liquids are not altered in any way.

The new substance can be used in any desired form, that is, either in the form of bodies which can be placed in vessels or other receptacles, or it can serve as a stopper for the same, or the walls of such vessels or receptacles can be coated with the substances in any desired form. For this special purpose a process for producing the radio-active substance can be employed, which consists in coating the vessels with a suitable binding agent and then washing the same with a liquid having radio-active substances dissolved therein before proceeding to the burning process.

In the accompanying drawing several forms of such radio-active bodies are shown by way of example.

Figure 2:
Figure 3:
Figure 4:
Figure 5:
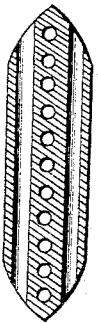
Figure 7:
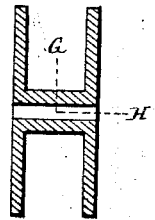
Figure 6:
Figure 8:

Figure 1 represents a bottle in which such a body having openings is contained. Figs. 2-8 show various forms of such bodies designed with the object of obtaining as large a surface as possible, either by providing recesses or holes or the like. Fig. 2, for example, represents a ball having two holes therein. Fig. 3, a longitudinal section, and Fig. 4, an end view of a cylinder. Fig. 5, a longitudinal section, and Fig. 6, an end view of a cylindrical body having rounded ends and provided with longitudinal and lateral holes, Fig. 7, a longitudinal section, and Fig. 8 a top view (partly in section on the line G—H in Fig. 7) of an H-shaped body in which are also provided a large number of perforations.

Such bodies can be produced as follows: A powdered radio-active material may be intimately mixed with loam, clay or other earthy substance, and the mixture then burned. By so doing the emanating property of the radio-active material is not destroyed, and the body, although it remains porous, becomes insoluble in water. If the entire body is formed from a uniform mixture it is of advantage, as shown in the drawing, to provide recesses, holes and the like, in order to increase the surface. The materials can however be so distributed that the outer surface contains more radio-active material than the inner parts. If it is desired to obtain a high degree of porosity carbon or sawdust can be mixed with the clay, loam, or other substance, which is driven off in the burning process. In similar manner entire vessels, such as bottles, tumblers, jugs or the like can be produced, the interior surfaces of which can be left porous, while the exteriors can be glazed. Further, the stoppers or lids can be produced from this substance.

Instead of mixing the radio-active material with the binding agents like shaped bodies can be rolled in active powdered or dissolved material. This however, must be so done that in the burning process the radio-active material and the other substance intended to carry it are bound together in the desired manner. Such masses can also be used for coating walls, for example, the inside of cupboards, casks, large baths, or other large vessels, and either the whole or a part of the same may be so coated. If it is desired to distribute the radio-activity inside such vessels as uniformly as possible, they can be rinsed or washed with a liquid in which the radio-active substance is dissolved so that the material of which the vessel, or the like, is formed will absorb such substance, and the binding may be done in the manner above explained, or in any other suitable way. If the baths or other vessels are made of tiles or plates, these can be treated in the manner described.

In such cases in which, for example, clay or loam like materials have themselves a radio-active property, it is of course not necessary to mix other radio-active substances. Moreover the invention offers the advantage that the bodies can receive a different degree of radio-activity. A larger or smaller quantity of the radio-active material can of course be mixed with the clay like or other material, and by suitably choosing the proportions of such materials the strength of the radio-activity is determined.

What I claim and desire to secure by Letters Patent of the United States is:—

1. A radio-active material composed of a radio-active substance and an argillaceous material, fire united.

2. A process for producing the described radio-active material, which consists in mixing a radio-active substance with an argillaceous binding agent and a combustible substance and then subjecting the mixture to heat sufficient to burn the argillaceous material, substantially as, and for the purpose, set forth.

3. The process of producing radio-active material, which comprises burning a mixture of a radio-active material and loam.

4. The process of producing radio-active material, which comprises burning a mixture of a radio-active material, a combustible filler and loam, thereby removing the filler to obtain a porous material from which the radio-active material is not soluble by ordinary liquids when in contact therewith.

5. The method of making radio-active bodies, which comprises mixing powdered radio-active material with loam, forming the mixture into the desired shape and burning the mixture.

6. The method of making radio-active bodies, which comprises mixing powdered radio-active material with an argillaceous material, forming the mixture into the desired shape and burning the mixture to fire unite the two materials.

7. The method of making radio-active bodies, which comprises intimately mixing carbon and an argillaceous material, mixing with said mixture a radio-active substance, forming the mixture into desired shapes and burning same, thereby driving out the carbon.

In testimony that I claim the foregoing as my invention, I have signed my name in presence of two subscribing witnesses.

CURT SCHMIDT.

Witnesses:
HENRY HASPER,
WOLDEMAR HAUPT.